June 10, 1958 V. C. WARDELL 2,838,400
TEA BAG
Filed April 19, 1954
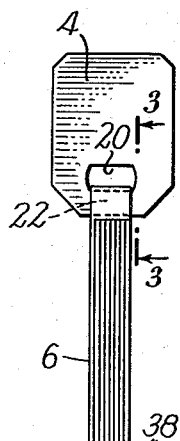
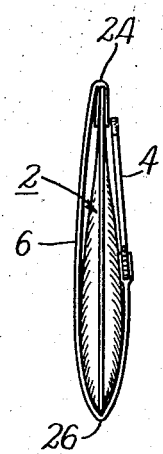
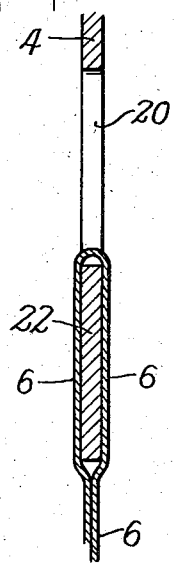
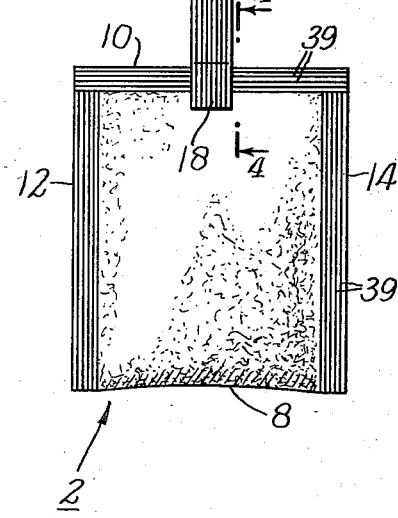
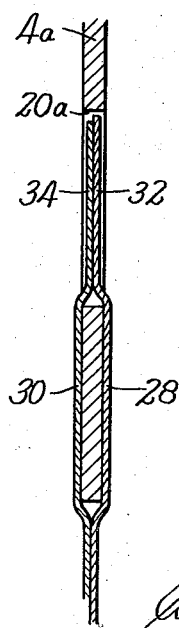
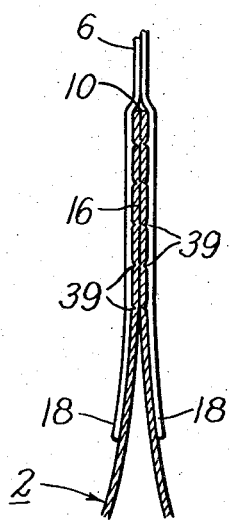
INVENTOR
Verris C. Wardell
BY
Curtis, Morris + Safford
ATTORNEYS

United States Patent Office 2,838,400
Patented June 10, 1958

2,838,400

TEA BAG

Verris C. Wardell, New York, N. Y.

Application April 19, 1954, Serial No. 424,193

6 Claims. (Cl. 99—77.1)

This invention relates to infusion bags or packages and more in particular to a package for holding tea and the like and having a tag and handle attached thereto. Although packages in accordance with the present invention are adapted to hold many types of substance, they are especially useful as tea bags, and the description herein will, for the sake of simplicity, be directed to such a use.

Accordingly, an object of this invention is to provide an improved tea bag; a further object is to provide a tea bag which may be quickly and economically manufactured; a further object is to provide a tea bag which is superior in use; a further object is to provide an attractive and readily usable tea bag which is adapted for rapid manufacture without the difficulties which have been encountered in the past. A further object is to provide a unitary tea bag construction which is readily manufactured and packaged and which is readily handled and used. These and other objects will be in part obvious and in part pointed out in the description below considered together with the drawing, in which:

Figure 1 is a scaled plan view of a tea bag constituting one embodiment of the invention;

Figure 2 is a side view of the tea bag of Figure 1 positioned for packaging;

Figures 3 and 4 are sectional views respectively on the lines 3—3 and 4—4 of Figure 1; and, Figure 5 shows an alternative arrangement for securing the handle to the tag.

Referring now to Figure 1 of the drawing, a tea bag generally indicated at 2 has a tag 4 attached thereto by a relatively flexible handle strip 6. In this embodiment, this bag 2 is formed from a single piece of somewhat porous filter paper, which is folded upon itself at the bottom edge 8. The top edge 10 and the side edges 12 and 14 of this bag 2 are heat and pressure-sealed together, e. g. by pressing them together between a pair of heated dies. Enclosed within the bag is a dose or quantity of tea. To facilitate heat-sealing, the bag may advantageously be formed from a fabric composition comprising a mixture of hemp and rayon, slightly impregnated on one side only with a plastic such as the type commonly known as "Vinyon"; such plastic is adapted to diffuse through a substantial portion of the fabric material and to adhesively secure adjacent layers thereof together upon cooling. The bag material is non-toxic and tasteless, thus to assure that the tea brew is not adversely affected chemically or tastewise.

As described, the edges of the material forming the tea bag are, in accordance with one aspect of the present invention, tightly and cohesively sealed together in a close, intimate manner, as particularly shown at 16 in Figure 4, thus preventing any escape of the tea from within the bag. The paper or other material from which the bag is formed advantageously has sufficient tensile strength when wet (i. e. "wet strength") to secure the bag against injury during normal use and normal handling and brewing. The porosity of the bag material permits the circulation of water into and from the dose of tea so as to insure rapid and thorough brewing.

The handle strip 6 is formed from a single strip of material such as the paper from which the bag 2 is formed or, advantageously, from the hemp and rayon composition mentioned above. The ends 18 of the strip are heat and pressure-sealed to the bag along the upper edges 10 thereof, and overlap and extend somewhat beyond the sealed adhesive zone of these upper edges (see particularly Figure 4). The strip 6 extends upwardly from the point where one end is attached to the bag 2 up to the tag 4 where it passes through an opening or slot 20 in the tag (see particularly Figure 3), and thence down back to the bag. Thus, the tag 4 is really attached by a loop at the center of the strip from which the handle 6 is formed. The two adjacent halves of the handle strip are heat and pressure-sealed together throughout the portions extending between the bag 2 and the tag 4, so as to provide a single handle formed by two thicknesses of the strip material. The strip 6 is corrugated at 38 during the sealing operation and produces a measure of rigidity and stiffness and corrugations 39 are similarly formed in the sealed edges of the bag 2 (see Figure 1).

As shown best in Figure 3, the strip 6 is pressed and held tightly to the portion 22 of the tag 4 which it encloses, so that the tag tends to maintain an upstanding or erect position with respect to the strip 6. Strip 6 and the sealed edges of the bag, although somewhat flexible, also have a tendency to maintain a straight flat condition and have considerable torsional resistance, especially after heat-treatment of the impregnated adhesive material and with the corrugations as mentioned hereinabove. Therefore, when the bag 2 is lowered into a cup of hot water, the heat sealed and corrugated strip and bag edges form a reliable support for the side walls of the bag and the enclosed tea. At the same time, the strip 6 tends to extend up alongside the cup and maintain the tag away from the water. Thus a very dependable support and handle is provided for the tea bag. However, for packaging the entire tea bag, the strip 6 may be folded around the tea bag 2 (see Figure 2), there being one fold at 24 and a second fold at 26. The tag 4 then lies flat against the side of the tea bag, thus forming a unitary, easily handled package. The relative stiffness of the tag and strip maintains this compact folded condition.

The strip handles of tea bags constructed in accordance with the present invention will not tend to become tangled or snarled when a number of bags are packaged together for storage or distribution, so that the necessity for providing each tea bag with a separate outer envelope, or other similarly undesirable expedient, is eliminated. This problem of string and handle tangling has heretofore been particularly acute, especially for institutional users such as hotels or restaurants, since untangling tea bags can take considerable time, and additionally because attempts to pull tea bags apart often results in tearing the strings from the bags and making the bags useless for individual dispensing purposes. Furthermore, tea bags as described herein do not require the use of staples, etc., and no holes need be punched or otherwise formed in the tea-enclosing envelope, so that there is no chance for the tea to escape during brewing or handling, and the attendant tearing of the bag is eliminated. The adhesive seal between the handle and the bag, additionally, provides substantial tensile strength and resistance to tearing or ripping, even when wet.

Referring now to Figure 5, which shows an alternative arrangement for securing the handle to the tag, the handle is formed of two equal-length strips 28 and 30 of impregnated fabric or paper, e. g. the hemp and rayon composition described hereinabove. The attachment of the lower ends of these individual strips to the bag is similar to that shown in Figure 4. However, the upper ends 32 and 34 of these strips are placed, face-to-face, within the opening 20a in the tag 4a, and are heat and pressure-sealed together in this position. The strips 28 and 30 are also sealed together and corrugated along the portions thereof extending between the tag and the bag. This construction of Figure 5 has certain superiorities in its adaptability to certain high-speed manufacturing processes.

Both of the constructions described are especially advantageous in that they avoid the problem of adhesively securing the handle strip to totally different materials; i. e. the tag which is relatively thick and made of glossy cardboard, plastic, etc., and the bag which is typically relatively thin and may be formed of paper, woven or unwoven fibrous material, etc.

Tea bags constructed in accordance with this invention are considerably better adapted for production by automatic machinery than those which are now assembled manually; and accordingly these new tea bags can be manufactured at a substantially higher rate and at a lower cost than those prior bags. Furthermore, with this new arrangement the tea bag is securely held and the widespread attachment between the strip 6 and the side walls of the tea bag insures against the tearing or ripping of the bag during handling or brewing.

While there is given above certain specific examples of this invention and its application in practical use, it should be understood that this is not intended to be exhaustive or to be limiting of the invention. On the contrary, these illustrations and the explanation herein is given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

What is claimed is:

1. An infusion bag of the character described comprising an envelope-shaped bag of liquid pervious material having at least one sealed edge and containing a brew substance to be soaked in a liquid, a separate handle for said bag including two portions each of a single ply length of a thin, ribbon-like strip of a material suitable for immersion in the liquid, said portions being adhesively sealed in face-to-face relation along their length except for a short distance at one end to give a relatively stiff handle of two plys only, and a tag of suitable flat shape having a hole cut through it, said tag being fastened to said handle by the engagement at said one end of said two portions through said hole respectively on opposite sides thereof, said handle being attached at its other end to the sealed edge of said bag.

2. The combination of elements as in claim 1 wherein said ribbon-like strip of material is substantially the same as the liquid pervious material of said bag and has concentrated on one face only a non-toxic thermoplastic adhesive, in which said two portions of said strip are heat sealed face-to-face in lengthwise corrugated fashion for added stiffness, and in which said two portions at their end opposite said one end are heat-sealed on opposite sides of said bag edge, whereby a handle and tag are provided for said bag which will not easily tear loose and which is substantially tangle-proof.

3. The combination of elements as in claim 2 wherein said two portions are a double-length piece of said strip folded double, and wherein said strip is looped through said tag hole at said one end of said two portions.

4. The combination of elements as in claim 2 wherein said two portions are separate lengths of said strip, and wherein said two portions are heat sealed together through said tag hole at said one end.

5. An infusion bag having an increased-strength, tangle-resistant handle and a separate tag, comprising an envelope shaped bag containing a brew substance and having walls of a thin paper-like material sealed along at least one edge, a tag of generally flat shape and of a material particularly suitable for decoration and display, and a handle joining said bag to said tag, said handle comprising two portions of a thin, ribbon-like strip of wet-strength, tasteless, non-toxic material having concentrated on one face a relatively high concentration of thermoplastic adhesive, said portions being heat-sealed face-to-face along their length except for a short distance at each end, and at one end being sealed on opposite sides, respectively, of said bag at said sealed edge, and being sealed at their other end on opposite sides respectively embracing a portion of said tag.

6. An infusion bag having a strong, tangle-resistant handle and tag, the combination comprising an infusion bag having walls of a thin paper-like filter material sealed along at least one edge and enclosing a brew substance, a tag of a material particularly suitable for decoration and display of advertising, and a handle joining said bag to said tag, said handle comprising two portions of substantially equal width and length of a thin paper-like material substantially the same as said bag filter material and which are adhesively sealed face-to-face along substantially all of their length, said portions at one end being tightly looped completely around a portion of said tag to anchor it firmly, and at their other end being adhesively sealed on opposite sides embracing a sealed edge of said bag.

References Cited in the file of this patent
UNITED STATES PATENTS

| | | |
|---|---|---|
| 1,665,080 | Abbott | Apr. 3, 1928 |
| 1,792,075 | Cooper | Feb. 10, 1931 |
| 2,291,278 | Cleaves | July 28, 1942 |
| 2,291,702 | Downes | Aug. 4, 1942 |
| 2,359,292 | Barnett | Oct. 3, 1944 |
| 2,397,651 | Doppelt | Apr. 2, 1946 |
| 2,406,137 | Eaton | Aug. 20, 1946 |
| 2,423,818 | Schmutzler | July 8, 1947 |
| 2,614,934 | Trotman | Oct. 21, 1952 |